United States Patent
Nishino

(10) Patent No.: US 10,528,417 B2
(45) Date of Patent: Jan. 7, 2020

(54) CLOCK SIGNAL INSPECTION DEVICE, PLANT MONITORING CONTROLLER, AND METHOD FOR DIAGNOSING CLOCK SIGNAL INSPECTION DEVICE

(71) Applicant: MITSUBISHI ELECTRIC CORPORATION, Chiyoda-ku, Tokyo (JP)

(72) Inventor: Yoshiyuki Nishino, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 105 days.

(21) Appl. No.: 15/877,757

(22) Filed: Jan. 23, 2018

(65) Prior Publication Data

US 2019/0079819 A1    Mar. 14, 2019

(30) Foreign Application Priority Data

Sep. 11, 2017   (JP) ................. 2017-173660

(51) Int. Cl.
| | |
|---|---|
| *G06F 11/00* | (2006.01) |
| *G06F 11/07* | (2006.01) |
| *G06F 1/06* | (2006.01) |
| *G05B 19/418* | (2006.01) |

(52) U.S. Cl.
CPC ...... *G06F 11/079* (2013.01); *G05B 19/41875* (2013.01); *G06F 1/06* (2013.01); *G06F 11/0736* (2013.01); *G06F 11/0757* (2013.01); *G06F 11/0772* (2013.01); *G05B 2219/34494* (2013.01)

(58) Field of Classification Search
CPC . H03K 21/40; G01R 31/31727; G06F 11/076; G06F 11/3409; G06F 2201/86; G06F 2201/88
See application file for complete search history.

(56) References Cited

U.S. PATENT DOCUMENTS 5,164,969 A * 11/1992 Alley ................. G06F 11/3409
                                                                377/39
5,845,060 A * 12/1998 Vrba ................... G06F 11/1683
                                                                714/12

(Continued)

FOREIGN PATENT DOCUMENTS

| JP | 2013-156732 A | | 8/2013 |
|---|---|---|---|
| JP | 2013156732 A | * | 8/2013 |

*Primary Examiner* — Loan L. T. Truong
(74) *Attorney, Agent, or Firm* — Buchanan Ingersoll & Rooney PC

(57) ABSTRACT

It is an object to provide a plant monitoring controller that is used as a plant monitoring controller and that can confirm the soundness of a clock signal serving as a reference for operation of each function unit and can diagnose the soundness of a clock signal inspection device itself, thereby having high reliability based on an accurate clock signal.
By using two clock signals having the same frequency, soundness of the respective clocks is diagnosed in two clock signal inspection circuits, and during normal operation of one system, a clock error is caused to occur in the other system in a pseudo manner and detection operation of the clock signal inspection circuit is confirmed, whereby online diagnosis of the clock signal inspection device itself is enabled.

13 Claims, 8 Drawing Sheets

(56) References Cited

U.S. PATENT DOCUMENTS

| | | | | |
|---|---|---|---|---|
| 7,750,618 | B1* | 7/2010 | Fang | H03L 7/08 |
| | | | | 324/76.41 |
| 8,279,917 | B2* | 10/2012 | Takahashi | H03K 7/08 |
| | | | | 332/109 |
| 8,797,082 | B2* | 8/2014 | Ramaswami | H03K 23/42 |
| | | | | 327/292 |
| 9,459,309 | B2* | 10/2016 | Pak | G01R 31/2601 |
| 2003/0025785 | A1* | 2/2003 | Nihei | G06K 15/1219 |
| | | | | 347/250 |
| 2004/0268189 | A1* | 12/2004 | Constantinescu | G06F 11/008 |
| | | | | 714/704 |
| 2005/0084050 | A1* | 4/2005 | Cheung | G06F 1/08 |
| | | | | 375/375 |
| 2008/0079407 | A1* | 4/2008 | Shimada | H03K 7/08 |
| | | | | 323/283 |
| 2008/0152058 | A1* | 6/2008 | Yeh | H04W 52/029 |
| | | | | 375/356 |
| 2009/0049327 | A1* | 2/2009 | Chung | G06F 1/3203 |
| | | | | 713/600 |
| 2011/0128771 | A1* | 6/2011 | Rao | G11C 13/0004 |
| | | | | 365/148 |
| 2015/0381158 | A1* | 12/2015 | Li | H03K 5/19 |
| | | | | 327/20 |
| 2017/0041006 | A1* | 2/2017 | Uezato | H03K 21/38 |
| 2019/0239173 | A1* | 8/2019 | Jia | H04W 56/001 |

* cited by examiner

CLOCK SIGNAL INSPECTION DEVICE, PLANT MONITORING CONTROLLER, AND METHOD FOR DIAGNOSING CLOCK SIGNAL INSPECTION DEVICE

BACKGROUND OF THE INVENTION

1. Field of the Invention

The present invention relates to a clock signal inspection device for inspecting the soundness of a clock signal for operating a control device provided in a plant monitoring controller or the like, a controller such as a plant monitoring controller using the clock signal inspection device, and a method for diagnosing the clock signal inspection device.

2. Description of the Background Art

A plant monitoring controller is an apparatus that has a function to detect breakage or the like of a device forming a plant and stop operation of the plant and that transmits information about stopping of operation of the plant to a central control room or the like for the plant. For example, in the case where the plant is a turbine generator, the plant monitoring controller has a function to detect breakage, an abnormality, or the like of a device of the turbine generator from a sensor provided to the device and stop a rotating turbine, and a communication function (network) to transmit information about a command for such stop to a central control room or the like.

A module for controlling the above communication function is equipped with a power supply. If the soundness of the power supply deteriorates, the module does not normally operate. For this, an arithmetic processing unit having a function to monitor the soundness of the power supply is provided. The arithmetic processing unit operates by a predetermined clock signal (frequency), the clock signal is a reference for determining timing of transmitting/receiving a signal with respect to the arithmetic processing unit, and it is necessary to inspect the soundness of the clock signal.

As a conventional method for inspecting a clock frequency, a method has been known in which soundness is confirmed by: calculating a difference between a clock at a certain time and a clock at a time that is after the certain time and sufficiently greatly apart from the certain time; and confirming that both clocks are the same.

Patent Document 1 below discloses, as a method for diagnosing a clock signal, a method in which, in a configuration including two central processing units (CPUs), each CPU compares the cycle of a clock signal for the CPU itself with the cycle of a clear pulse signal of a watchdog timer outputted from the other CPU, thereby determining whether both clock signals are in a normal state.

Patent Document 1: Japanese Laid-Open Patent Publication No. 2013-156732

In Patent Document 1, when a clock frequency inspection device determines an "abnormality" and a signal of the "abnormality" is transmitted to an elevator controller, the elevator controller puts out an alert, or stops an external device, for example, stops an elevator at the nearest floor. That is, the conventional clock signal frequency inspection device outputs an error signal to the outside, and all the functions of devices operated by the clock signal are stopped. Thus, it is important that the clock frequency inspection device is normally operating.

As a method for confirming normal operation, there is a method including: making settings such that a clock error intentionally occurs; confirming that the clock error is diagnosed; then returning the settings to the normal state; and confirming that the clock error has not occurred. In this method, when the clock error is caused, all the functions of an arithmetic processing unit such as an IC stop. Thus, this method cannot be easily executed. That is, with the conventional clock frequency inspection device, it is difficult to confirm that the clock frequency inspection device itself is normally operating.

Meanwhile, a plant such as a turbine generator is required to have high safety and reliability, and thus a monitoring apparatus for monitoring the plant is required to have high reliability and accuracy. Therefore, control systems and monitoring systems have been multiplied, so that it is important to perform online diagnose without stopping devices forming the plant.

SUMMARY OF THE INVENTION

The present invention has been made to solve the above-described problem, and an object of the present invention is to provide a clock signal inspection device that is able to diagnose not only the soundness of a clock signal but also the soundness of the clock signal inspection device, online, without stopping an arithmetic processing unit, in a controller such as a plant monitoring controller. In addition, another object of the present invention is to provide a controller equipped with the clock signal inspection device.

A clock signal inspection device according to the present invention includes: a first clock signal inspection circuit including a first counter to which a first clock signal is inputted and which counts the first clock signal for a first time, a first comparison counter to which a second clock signal having the same frequency as that of the first clock signal is inputted and which counts the second clock signal and outputs a count value of the second clock signal in response to an output signal from the first counter, a first comparator which compares an expected value expected to be obtained by the first comparison counter counting the second clock signal for the first time, with the count value outputted from the first comparison counter, and outputs an error signal if there is an error therebetween, and a first output circuit which outputs the error signal to the outside in response to the output signal from the first counter when the error signal is inputted from the first comparator; and a second clock signal inspection circuit including a second counter to which the second clock signal is inputted and which counts the second clock signal for the first time, a second comparison counter to which the first clock signal is inputted and which counts the first clock signal and outputs a count value of the first clock signal in response to an output signal from the second counter, a second comparator which compares an expected value expected to be obtained by the second comparison counter counting the first clock signal for the first time, with the count value outputted from the second comparison counter, and outputs an error signal if there is an error therebetween, and a second output circuit which outputs the error signal to the outside in response to the output signal from the second counter when the error signal is inputted from the second comparator. In the first clock signal inspection circuit, a time for which count is performed by the first counter is changed from the first time to a second time; the first comparator compares the count value of the second clock signal outputted from the first comparison counter in response to the output signal from the first counter, with the expected value expected to be obtained by the first comparison counter counting the second clock signal for the first time, and outputs the error signal; and then, the time for which count is performed by the first counter is changed from the second time to the first time, the first comparator compares the expected value expected to be obtained by the first comparison counter counting the second clock signal for the first time, with the count value of the second clock signal outputted from the first comparison counter, and soundness of the first clock signal inspection circuit is determined.

A plant monitoring controller according to the present invention includes an input circuit to which a signal from a device forming a plant is inputted, an arithmetic processing unit which performs arithmetic processing on the signal, an output circuit which outputs data resulting from the arithmetic processing to the device forming the plant, and a communication circuit which receives a signal from a central controller and transmits the signal from the device forming the plant and the data resulting from the arithmetic processing to the central controller. A clock signal used for controlling the communication circuit is inspected by the above-described clock signal inspection device.

The clock signal inspection device according to the present invention makes it possible to obtain a highly-reliable clock signal inspection device that can confirm the soundness of the clock signal and diagnose the soundness of the clock signal inspection device itself online.

With the plant monitoring controller according to the present invention, the clock signal inspection device is composed of two systems, and diagnosis of the soundness of the clock signal inspection devices themselves can be individually performed online. Thus, even when an error regarding one of the clock signal inspection devices occurs, the soundness of the clock signal can be confirmed by the other clock signal inspection device. Furthermore, since the soundness of the clock signal inspection devices themselves can be individually diagnosed online, it becomes possible to inhibit stop of the communication circuit and the like.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

Figure 1:
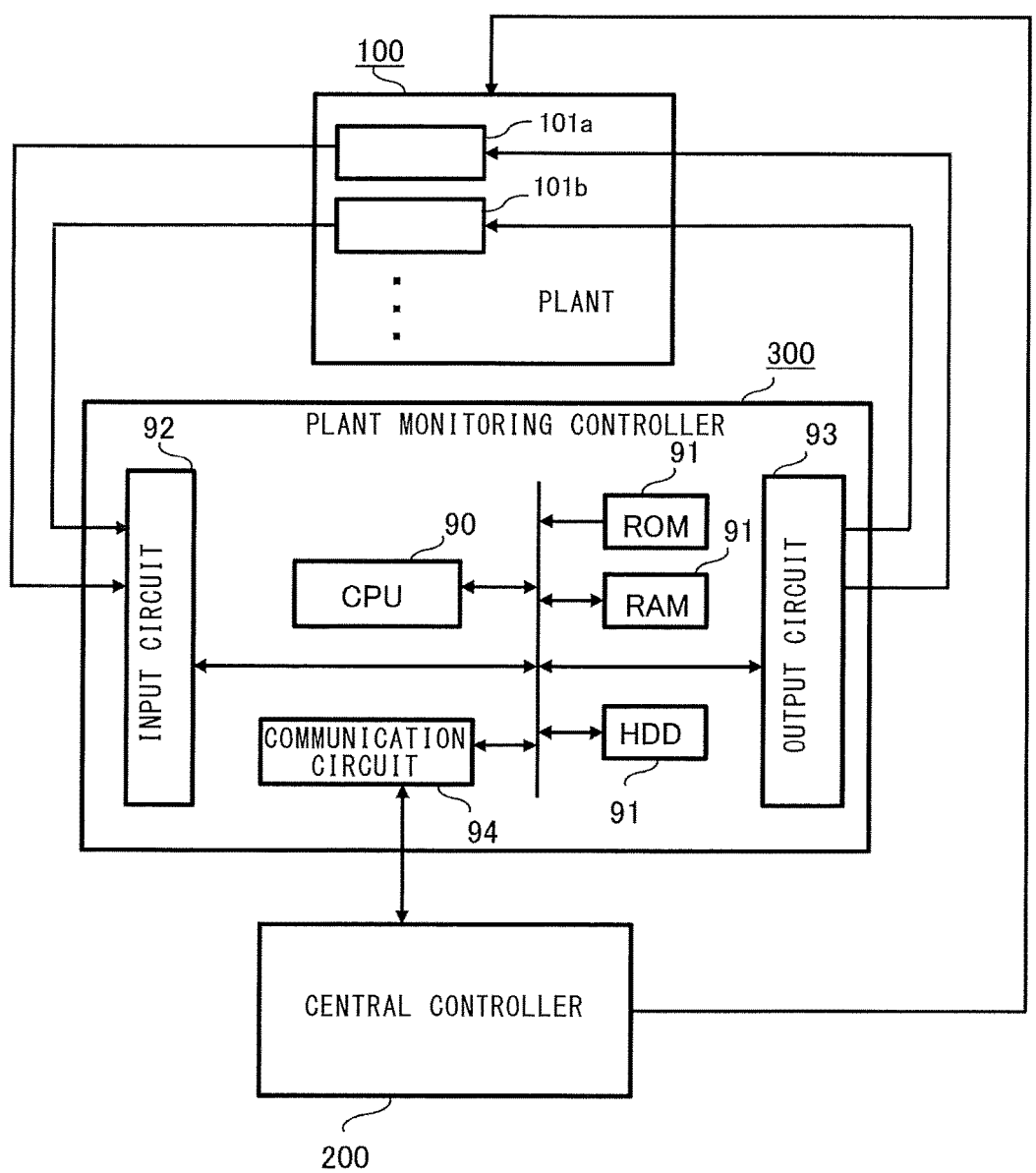
FIG. 1 is a configuration diagram of a controller according to Embodiment 1 of the present invention.

Hereinafter, an embodiment for carrying out the present invention will be described with reference to the drawings. In each drawing, the same reference characters denote the same or corresponding portions.

Embodiment 1

A clock signal inspection device and a plant monitoring controller, using the clock signal inspection device, according to Embodiment 1 of the present invention will be described with reference to the drawings.

[Configuration of Plant Monitoring Controller]

FIG. 1 shows the configuration of a plant monitoring controller 300 as an example of the controller according to Embodiment 1 of the present invention. The plant monitoring controller 300 is an apparatus that has a function to monitor operating states of devices 101a and 101b forming a plant 100, detect breakage or the like of the devices 101a and 101b, and stop operation of the plant 100 and that transmits information about stopping of operation of the plant 100 to a central controller 200 or the like for the plant 100. In the present embodiment, among plants, a plant such as a turbine generator including multiple systems for monitoring control is premised. The plant monitoring controller 300 is a monitoring controller that has a function to detect breakage, an abnormality, or the like of a device of the turbine generator from various sensors provided to the device and stop a rotating turbine, and a communication function to transmit information about a command for such stop to the central controller 200 or the like.

As shown in FIG. 1, in the plant monitoring controller 300, an input circuit 92 receives information about breakage or the like from sensors or the like provided to the devices 101a and 101b forming the plant 100, an arithmetic processing unit 90 (computer) such as a CPU included in the plant monitoring controller 300 processes the information, and an output circuit 93 transmits the processed information to the plant 100.

The plant monitoring controller 300 includes, as processing devices, a storage device 91 that exchanges data with the arithmetic processing unit 90, the input circuit 92 that inputs an external signal to the arithmetic processing unit 90, the output circuit 93 that outputs a signal from the arithmetic processing unit 90 to the outside, and a communication circuit 94 through which the arithmetic processing unit 90 performs data communication with the external central controller 200.

As the arithmetic processing unit 90, an application specific integrated circuit (ASIC), an integrated circuit (IC), a digital signal processor (DSP), a field programmable gate array (FPGA), various logical circuits, various signal processing circuits, and the like may be provided. In addition, as the arithmetic processing unit 90, the same type or different types of multiple arithmetic processing units may be provided, and each processing may be executed in a shared manner by the arithmetic processing units. As the storage device 91, a random access memory (RAM) configured to be able to read data from the arithmetic processing unit 90 and write the data thereon, a read only memory (ROM) configured to be able to read data from the arithmetic processing unit 90, and the like are included. Various sensors and switches of the devices 101a and 101b forming the plant 100 are connected to the input circuit 92, and the input circuit 92 includes an A/D converter that inputs output signals from these sensors and switches to the arithmetic processing unit 90, and the like. Electric loads such as switching elements of the devices 101a and 101b forming the plant 100 are connected to the output circuit 93, and the output circuit 93 includes a driving circuit that outputs a control signal from the arithmetic processing unit 90 to these electric loads, and the like.

[Configurations of Communication Circuit and Communication Controller]

The communication circuit 94 includes various logical circuits, various signal processing circuits, and the like, and is connected to an external controller such as the central controller 200 via a communication system, and communication based on various communication protocols is performed therebetween.

Figure 2:
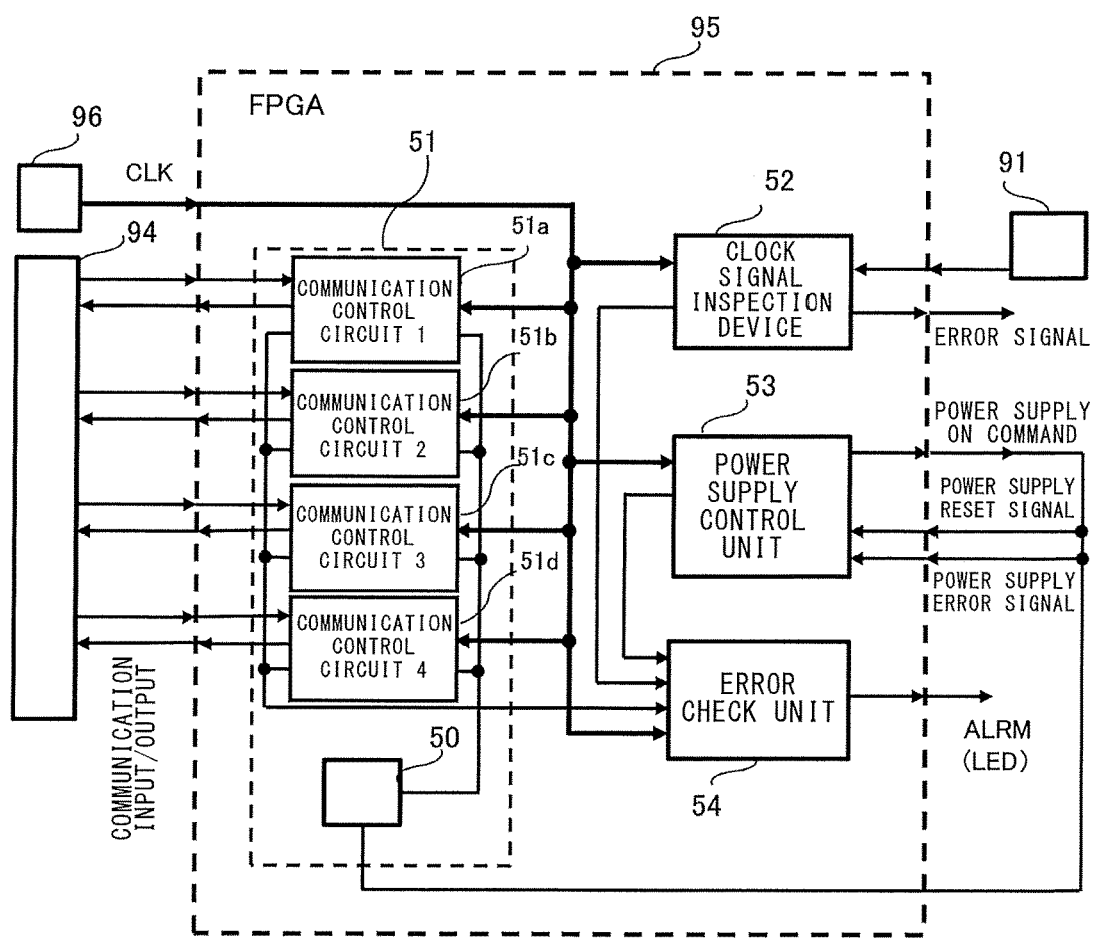
FIG. 2 is a configuration diagram of a communication controller equipped with a clock signal inspection device according to Embodiment 1 of the present invention.

Next, the configuration of a communication controller that controls the communication circuit 94 will be described with reference to the drawing. FIG. 2 is a schematic diagram showing the configuration of a communication controller 95. In the present embodiment, an example in which an FPGA is used as the communication controller 95 is described. The FPGA 95 includes a communication control unit 51 including therein a power supply 50, a power supply control unit 53 that controls the power supply 50, a clock signal inspection device 52 that is a clock signal inspection unit for inspecting a clock frequency for inspecting the soundness of a clock signal inputted from an external clock signal generator 96, and an error check unit 54 that outputs an alarm signal to the outside, for example, lights up a LED when an error occurs in each component unit.

Since the communication circuit 94 performs communication with the central controller 200 that performs centralized control of the plant, stable operation of the communication control unit 51 of the communication controller 95, which controls the communication circuit 94, is important. Thus, if the soundness of the power supply 50 deteriorates, the communication controller 95 does not normally operate. Therefore, the power supply control unit 53 has a function for monitoring the soundness of the power supply 50. The FPGA is an arithmetic processing unit that is freely programmable and that is able to read a program from the storage device 91 and change or update the program, and thus is suitable as the communication controller 95 that controls each unit.

FIG. 2 shows an example in which the communication control unit 51 is configured to have communication control circuits 1 (51a) to 4 (51d) for four channels. The respective communication control circuits 1 to 4 are supplied with power from the power supply 50 and operate, and communication input/output is performed at timing of a clock signal CLK. In addition, the respective communication control circuits 1 to 4 have a function to check input/output signals, and output an error signal if there is an abnormality.

The power supply control unit 53 transmits a command for turning on the power supply 50 or forcing the power supply 50 to be turned off, monitors whether the power supply 50 is in a normal state, and receives a reset or error signal or the like from the power supply 50.

The clock signal inspection device 52 includes an inspection circuit as a clock frequency inspection unit.

The clock signal CLK is inputted from the outside to the communication control unit 51, the clock signal inspection device 52, the power supply control unit 53, and the error check unit 54 at the same timing, and serves as a reference for operation timing of each unit. If the soundness of the clock signal CLK deteriorates, the function of the FPGA stops, which influences the communication circuit 94 and the entirety of the communication controller 95. Thus, for monitoring the soundness of the power supply 50, it is important to ensure the soundness of the clock signal CLK, and it is necessary to monitor the soundness of the clock signal CLK.

[Configuration of Clock Signal Inspection Device]

Next, the circuit configuration of the clock signal inspection device 52 as the clock signal inspection device will be described with reference to the drawing.

Figure 3:
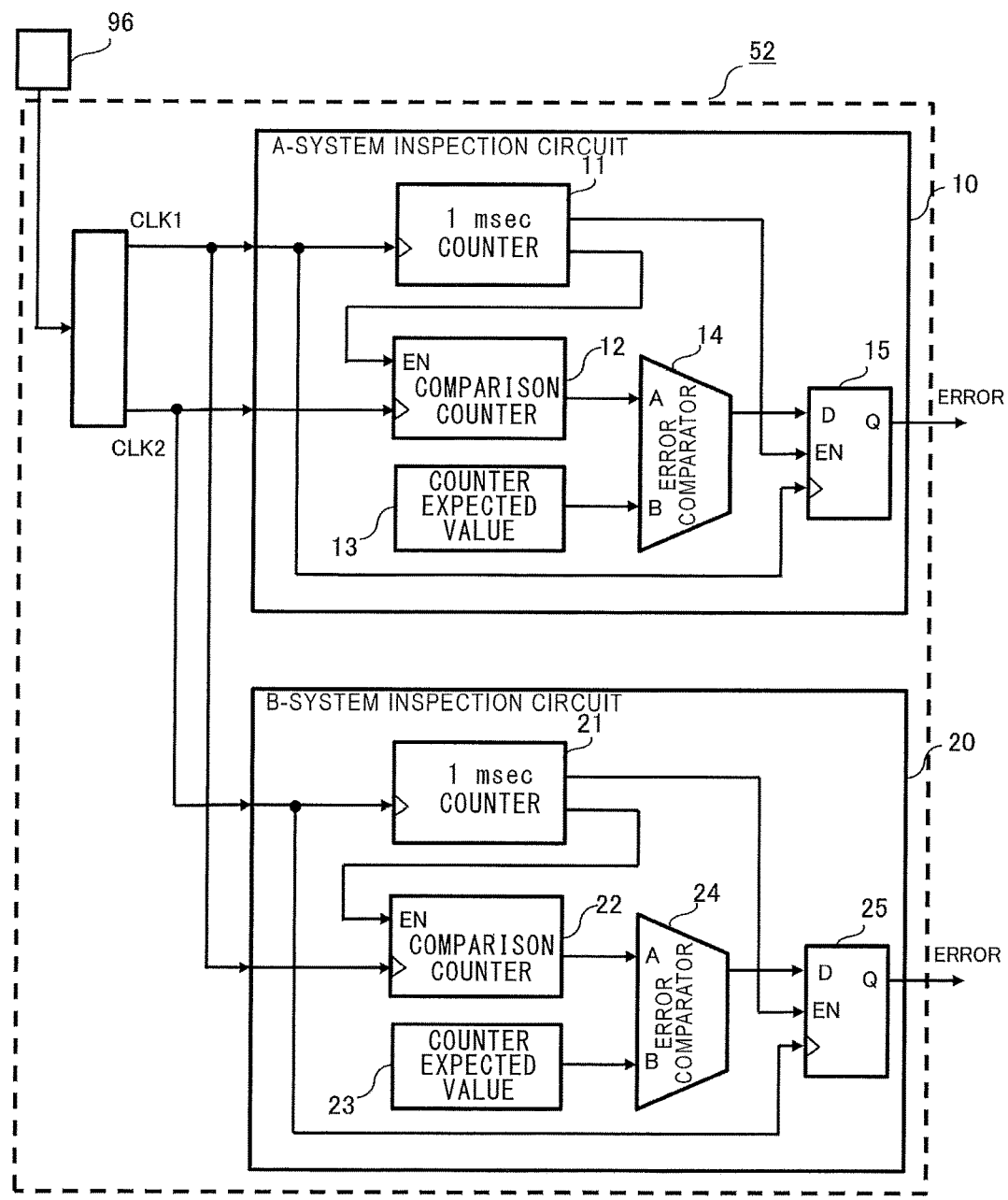
FIG. 3 is a diagram showing the circuit configuration of the clock signal inspection device according to Embodiment 1 of the present invention.

FIG. 3 is a diagram showing the circuit configuration of the clock signal inspection device 52 according to Embodiment 1 of the present invention. In FIG. 3, two circuits, that is, an A-system inspection circuit 10 and a B-system inspection circuit 20 that are the same, are included, and clock signals CLK1 and CLK2 that are two clock signals having the same frequency are generated from the clock signal CLK inputted from the external clock signal generator 96 and are inputted to the inspection circuits 10 and 20, respectively. In FIG. 3, the clock signal CLK2 is an object to be inspected in the A-system inspection circuit 10, and the clock signal CLK1 is an object to be inspected in the B-system inspection circuit 20.

Figure 4:
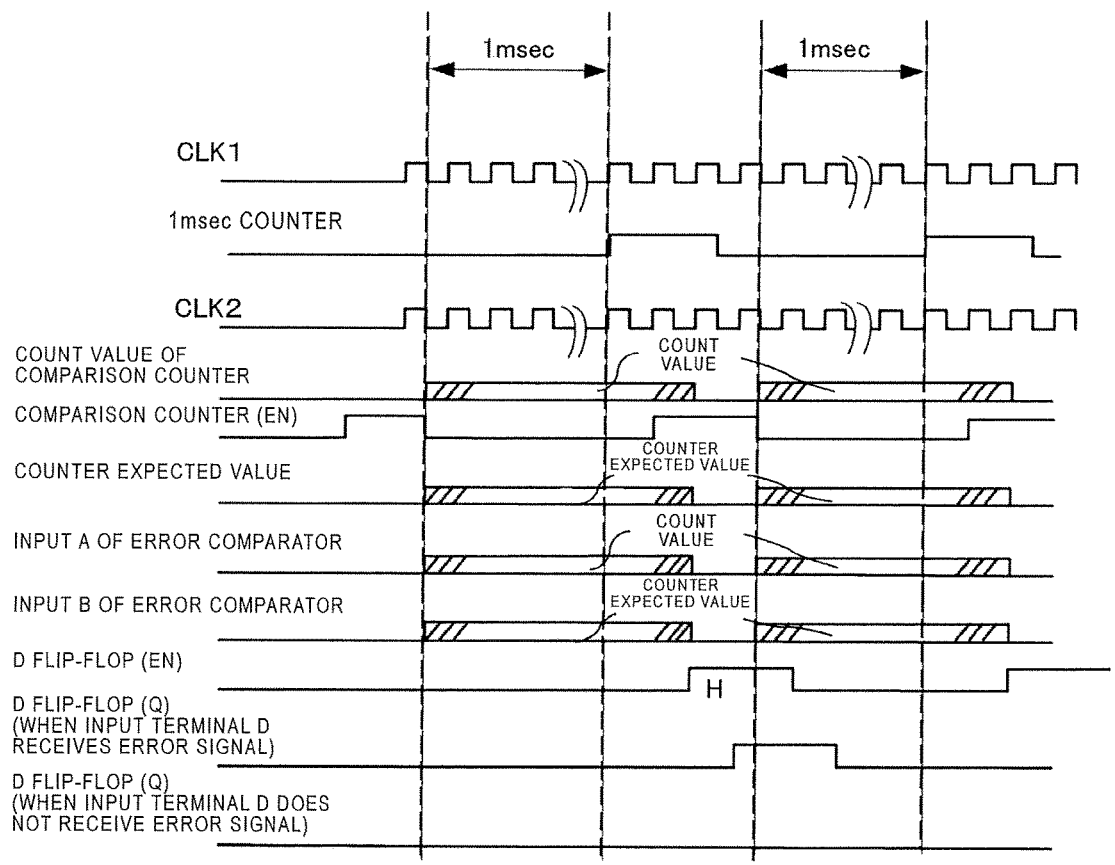
FIG. 4 is a timing chart of signals in circuits in the clock signal inspection device according to Embodiment 1 of the present invention.

FIG. 4 is a timing chart of signals in the circuits in the clock signal inspection device 52 in FIG. 3.

In FIGS. 3 and 4, the clock signal CLK1 is inputted to a 1 msec counter 11 of the A-system inspection circuit 10. When the clock signal CLK1 is inputted to the 1 msec counter 11, the 1 msec counter 11 counts the clock signal CLK1 every 1 msec that is a constant cycle, outputs a count value as a pulse signal to an EN terminal of a comparison counter 12 and an EN terminal of a D flip-flop circuit 15 every 1 msec, and repeats count. The clock signal CLK2 is inputted to the comparison counter 12 of the A-system inspection circuit 10, and the comparison counter 12 counts the clock signal CLK2. When the pulse signal from the 1 msec counter 11 is inputted to the EN terminal of the comparison counter 12, the comparison counter 12 stops the count and outputs the count value at this time to an input terminal A of an error comparator 14. A counter expected value 13 that the comparison counter 12 is assumed to output is inputted to an input terminal B of the error comparator 14, and the error comparator 14 compares both values. If there is an error between both values, an error signal is inputted to an input terminal D of the D flip-flop circuit 15. When the pulse signal from the 1 msec counter 11 is inputted to the EN terminal of the D flip-flop circuit 15 (H), the error signal, which is output of the error comparator 14, is outputted from an output terminal Q of the D flip-flop circuit 15 on the basis of the timing of the clock signal CLK1. Since the pulse signal from the 1 msec counter 11 is inputted to the EN terminal of the D flip-flop circuit 15 every constant cycle, if the error signal is outputted from the error comparator 14, the output terminal Q of the D flip-flop circuit 15 outputs the error signal every constant cycle, so that it is recognized that the clock signal CLK2 has caused a clock error. On the other hand, if the error signal is not outputted from the error comparator 14, the output terminal Q of the D flip-flop circuit 15 does not output a signal.

Similarly, operation in the B-system inspection circuit 20 is as follows.

The clock signal CLK2 is inputted to a 1 msec counter 21 of the B-system inspection circuit 20. When the clock signal CLK2 is inputted to the 1 msec counter 21, the 1 msec counter 21 counts the clock signal CLK2 every 1 msec that is a constant cycle, outputs a count value as a pulse signal to an EN terminal of a comparison counter 22 and an EN terminal of a D flip-flop circuit 25 every 1 msec, and repeats count. The clock signal CLK1 is inputted to the comparison counter 22 of the B-system inspection circuit 20, and the comparison counter 22 counts the clock signal CLK1. When the pulse signal from the 1 msec counter 21 is inputted to the EN terminal of the comparison counter 22, the comparison counter 22 stops the count and outputs the count value at this time to an input terminal A of an error comparator 24. A counter expected value 23 that the comparison counter 22 is assumed to output is inputted to an input terminal B of the error comparator 24, and the error comparator 24 compares both values. If there is an error between both values, an error signal is inputted to an input terminal D of the D flip-flop circuit 25. When the pulse signal from the 1 msec counter 21 is inputted to the EN terminal of the D flip-flop circuit 25 (H), the error signal, which is output of the error comparator 24, is outputted from an output terminal Q of the D flip-flop circuit 25 on the basis of the timing of the clock signal CLK2. Since the pulse signal from the 1 msec counter 21 is inputted to the EN terminal of the D flip-flop circuit 25 every constant cycle, if the error signal is outputted from the error comparator 24, the output terminal Q of the D flip-flop circuit 25 outputs the error signal every constant cycle, so that it is recognized that the clock signal CLK1 has caused a clock error. On the other hand, if the error signal is not outputted from the error comparator 24, the output terminal Q of the D flip-flop circuit 25 does not output a signal.

By generating two signals having the same frequency from the clock signal, configuring the circuit by two systems of the A-system inspection circuit 10 and the B-system inspection circuit 20, and inspecting the clock signal as described above, even if a problem or breakdown occurs in any one of the inspection circuits, it becomes possible to inspect the clock signal by the other inspection circuit.

[Configuration of Diagnosis Circuit of Clock Signal Inspection Device]

Next, a circuit configuration for diagnosing the soundness of the clock signal inspection device 52 will be described.

Figure 5:
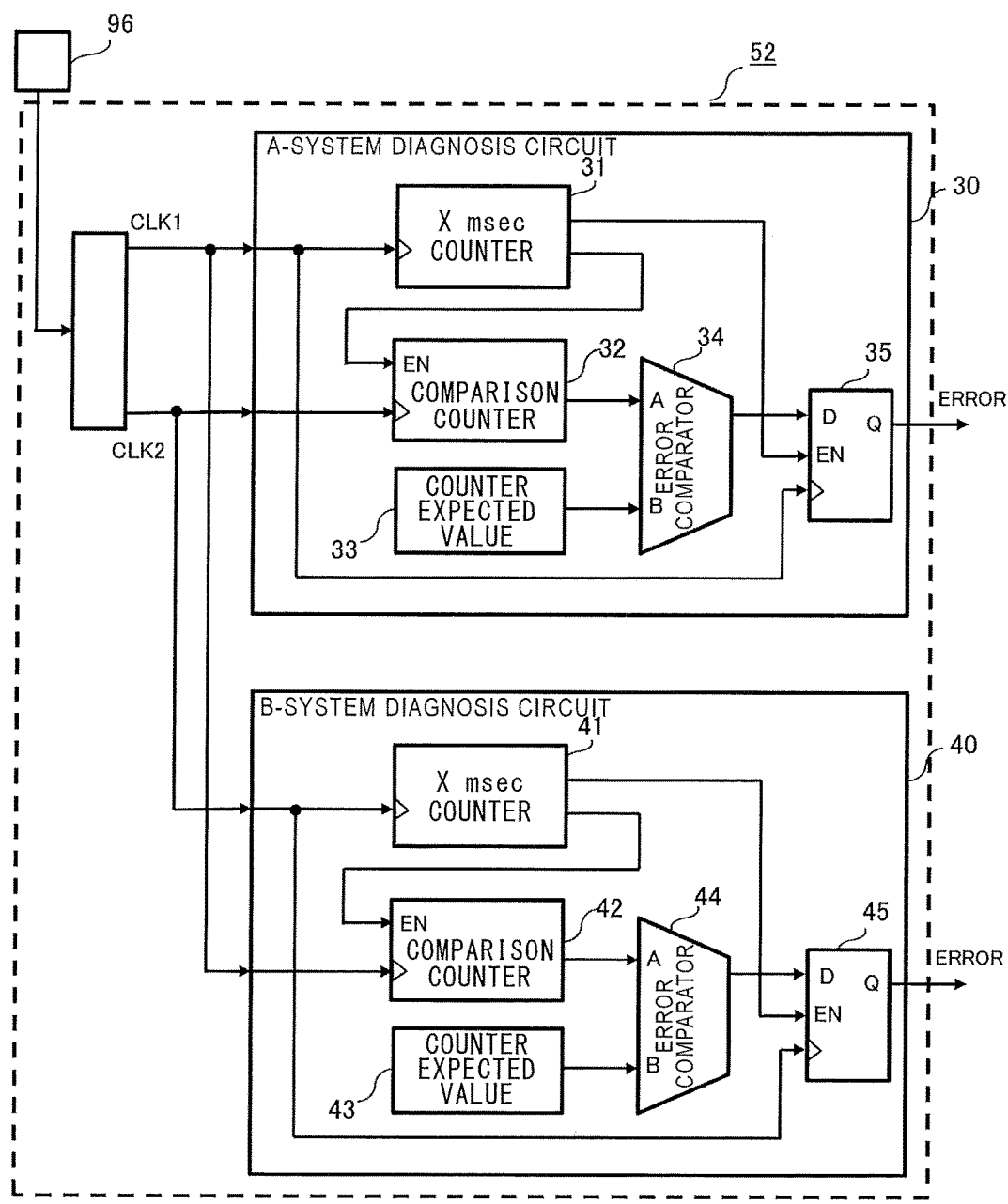
FIG. 5 is a diagram for illustrating a circuit configuration established when the clock signal inspection device according to Embodiment 1 of the present invention diagnoses the inspection device itself.

FIG. 5 is a diagram for illustrating a circuit configuration established when the clock signal inspection device according to Embodiment 1 of the present invention diagnoses the inspection device itself. In FIG. 5, settings of the 1 msec counters 11 and 21 in FIG. 3 are changed such that the 1 msec counters 11 and 21 are changed into X msec counters 31 and 41 each of which performs count for an optional time different from 1 msec. This change can be easily handled in the FPGA, for example, by reading a program of the storage device 91 and changing the settings.

In FIG. 5, the clock signal CLK1 is inputted to the X msec counter 31 of an A-system diagnosis circuit 30. When the clock signal CLK1 is inputted to the X msec counter 31, the X msec counter 31 counts the clock signal CLK1 every optional time X msec, outputs a count value as a pulse signal to an EN terminal of a comparison counter 32 and an EN terminal of a D flip-flop circuit 35 every X msec, and repeats count. The clock signal CLK2 is inputted to the comparison counter 32 of the A-system diagnosis circuit 30, and the comparison counter 32 counts the clock signal CLK2. When the pulse signal from the X msec counter 31 is inputted to the EN terminal of the comparison counter 32, the comparison counter 32 stops the count and outputs the count value at this time to an input terminal A of an error comparator 34. A counter expected value 33 is inputted to an input terminal B of the error comparator 34 as a counter expected value that is a value that the comparison counter 32 is assumed to output when the X msec counter 31 is a 1 msec counter. The error comparator 34 compares the counter expected value 33 with the value inputted from the comparison counter 32. In this case, the values obtained by the counts for 1 msec and for X msec, which is an optional time and not 1 msec, are compared, and thus an error is determined.

Similarly, operation in a B-system diagnosis circuit 40 is as follows.

The clock signal CLK2 is inputted to the X msec counter 41 of the B-system diagnosis circuit 40. When the clock signal CLK2 is inputted to the X msec counter 41, the X msec counter 41 counts the clock signal CLK2 every optional time X msec, outputs a count value as a pulse signal to an EN terminal of a comparison counter 42 and an EN terminal of a D flip-flop circuit 45 every X msec, and repeats count. The clock signal CLK1 is inputted to the comparison counter 42 of the B-system diagnosis circuit 40, and the comparison counter 42 counts the clock signal CLK1. When the pulse signal from the X msec counter 41 is inputted to the EN terminal of the comparison counter 42, the comparison counter 42 stops the count and outputs the count value at this time to an input terminal A of an error comparator 44. A counter expected value 43 is inputted to an input terminal B of the error comparator 44 as a counter expected value that is a value that the comparison counter 42 is assumed to output when the X msec counter 41 is a 1 msec counter. The error comparator 44 compares the counter expected value 43 with the value inputted from the comparison counter 42. In this case, the values obtained by the counts for 1 msec and for X msec, which is an optional time and not 1 msec, are compared, and thus an error is determined.

Here, in the A-system diagnosis circuit 30 and the B-system diagnosis circuit 40, settings of the X msec counters 31 and 41, each of which performs count for an optional time, are returned to the 1 msec counters, and confirmation of operation as the inspection circuits for the clock signal is performed as described above.

[Procedure of Inspection of Clock Signal and Procedure of Diagnosis of Clock Signal Inspection Device]

Next, a procedure of inspection of the clock signal and a procedure of diagnosis of the soundness of the clock signal inspection device 52 will be described by using flowcharts.

Figure 6:
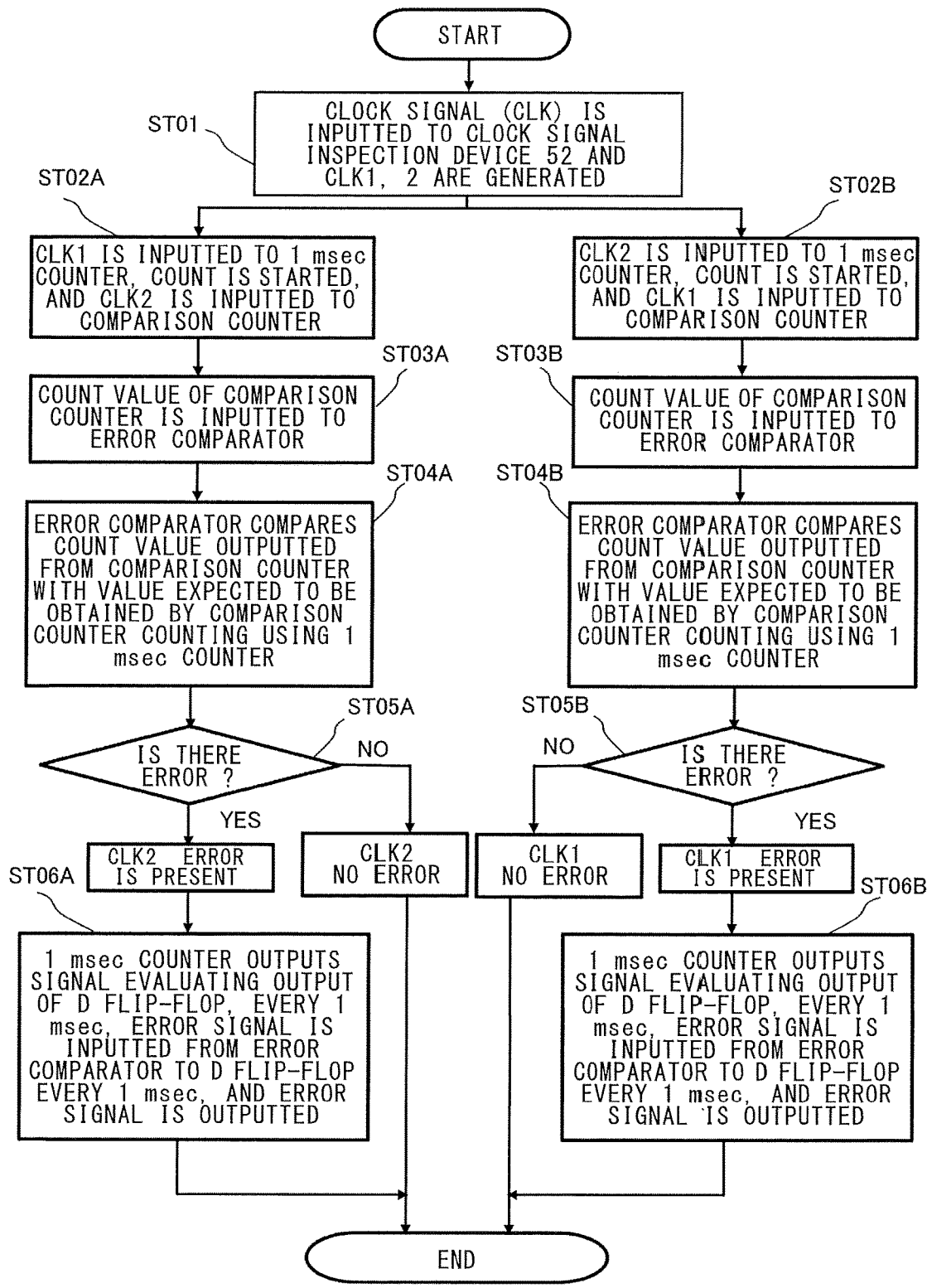
FIG. 6 is a flowchart for illustrating a procedure through which the clock signal inspection device according to Embodiment 1 of the present invention performs inspection of a clock signal.

First, the procedure of inspection of the clock signal will be described with reference to FIG. 6. FIG. 6 is a flowchart for illustrating the procedure through which the clock signal inspection device according to Embodiment 1 of the present invention performs inspection of the clock signal.

When the clock signal CLK is inputted to the FPGA 95 which is the communication controller, operation of each function unit of the FPGA 95 is controlled in accordance with the timing of the clock signal CLK. When the clock signal CLK is inputted to the clock signal inspection device 52, the clock signals CLK1 and CLK2, which are two clock signals having the same frequency, are generated (step ST01).

The clock signal CLK1 is inputted to the 1 msec counter 11 of the A-system inspection circuit 10, and the 1 msec counter 11 starts count. At the same time, the clock signal CLK2 is inputted to the comparison counter 12 of the A-system inspection circuit 10, and the comparison counter 12 starts count (step ST02A).

After 1 msec, the count of the 1 msec counter 11 ends, the count value of the 1 msec counter 11 is inputted to the EN terminal of the comparison counter 12, and the count value of the comparison counter 12 at this time is inputted to the input terminal A of the error comparator 14 (step ST03A).

The error comparator 14 compares the counter expected value 13 that is inputted to the input terminal B and that the comparison counter 12 is assumed to output, with the count value inputted from the comparison counter 12 (step ST04A).

The clock signal CLK1 and the clock signal CLK2 are signals having the same frequency, and both values are count values after the same 1 msec measurement. Thus, if there is no problem in the signal, both values should be originally the same at the error comparator 14. Therefore, the error comparator 14 determines presence/absence of an error (step ST05A), and determines that the clock signal CLK2 has no error (no problem), if there is no error. Here, if there is a 0.1% difference between the count values, it is determined that there is an error.

If the count values are not the same at the error comparator 14 and there is an error therebetween, it is determined that the clock signal CLK2 has an error (problem), and an error signal is inputted to the input terminal D of the D flip-flop circuit 15. When the pulse signal from the 1 msec counter 11 is inputted to the EN terminal of the D flip-flop circuit 15 (H), the output is validated, and the error signal is outputted from the output terminal Q of the D flip-flop circuit 15 (step ST06A).

Similarly, a procedure at the right side from step ST01 in the B-system inspection circuit 20 will be described.

The clock signal CLK2 is inputted to the 1 msec counter 21 of the B-system inspection circuit 20, and the 1 msec counter 21 starts count. At the same time, the clock signal CLK1 is inputted to the comparison counter 22 of the B-system inspection circuit 20, and the comparison counter 22 starts count (step ST02B).

After 1 msec, the count of the 1 msec counter 21 ends, the count value of the 1 msec counter 21 is inputted to the EN terminal of the comparison counter 22, and the count value of the comparison counter 22 at this time is inputted to the input terminal A of the error comparator 24 (step ST03B).

The error comparator 24 compares the counter expected value 23 that is inputted to the input terminal B and that the comparison counter 22 is assumed to output, with the count value inputted from the comparison counter 22 (step ST04B).

The clock signal CLK1 and the clock signal CLK2 are signals having the same frequency, and both values are count values after the same 1 msec measurement. Thus, if there is no problem in the signal, both values should be originally the same at the error comparator 24. Therefore, the error comparator 24 determines presence/absence of an error (step ST05B), and determines that the clock signal CLK1 has no error (no problem), if there is no error. Here, if there is a 0.1% difference between the count values, it is determined that there is an error.

If the count values are not the same at the error comparator 24 and there is an error therebetween, it is determined that the clock signal CLK1 has an error (problem), and an error signal is inputted to the input terminal D of the D flip-flop circuit 25. When the pulse signal from the 1 msec counter 21 is inputted to the EN terminal of the D flip-flop circuit 25 (H), the output is validated, and the error signal is outputted from the output terminal Q of the D flip-flop circuit 25 (step ST06B).

Whether the clock signal CLK2 has a clock error can be determined in the A-system inspection circuit 10, and whether the clock signal CLK1 has a clock error can be determined in the B-system inspection circuit 20, on the basis of output of an error signal.

Figure 7A:
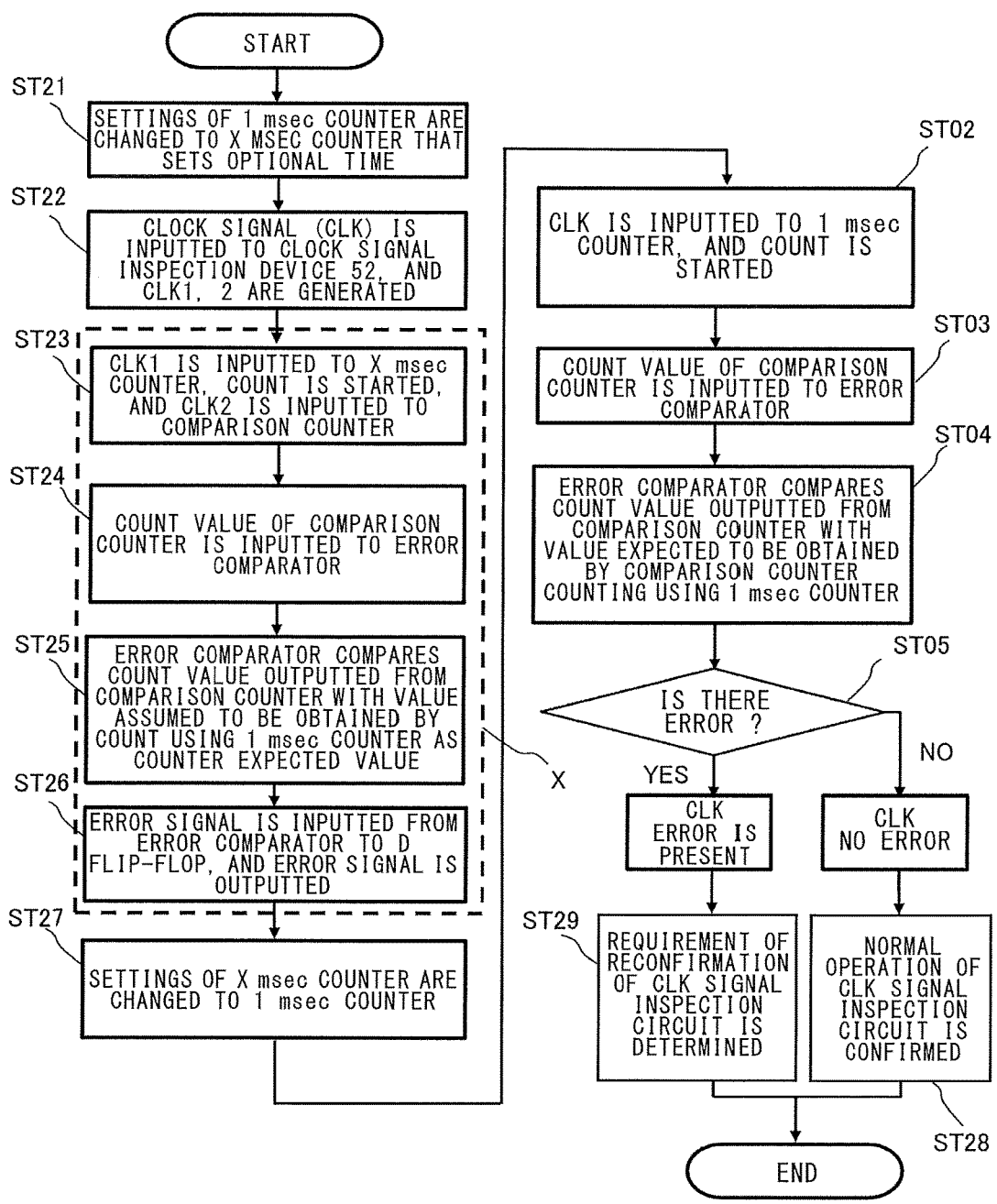
FIG. 7A is a flowchart for illustrating a procedure through which the clock signal inspection device according to Embodiment 1 of the present invention diagnoses the soundness of the inspection device itself.
Figure 7B:
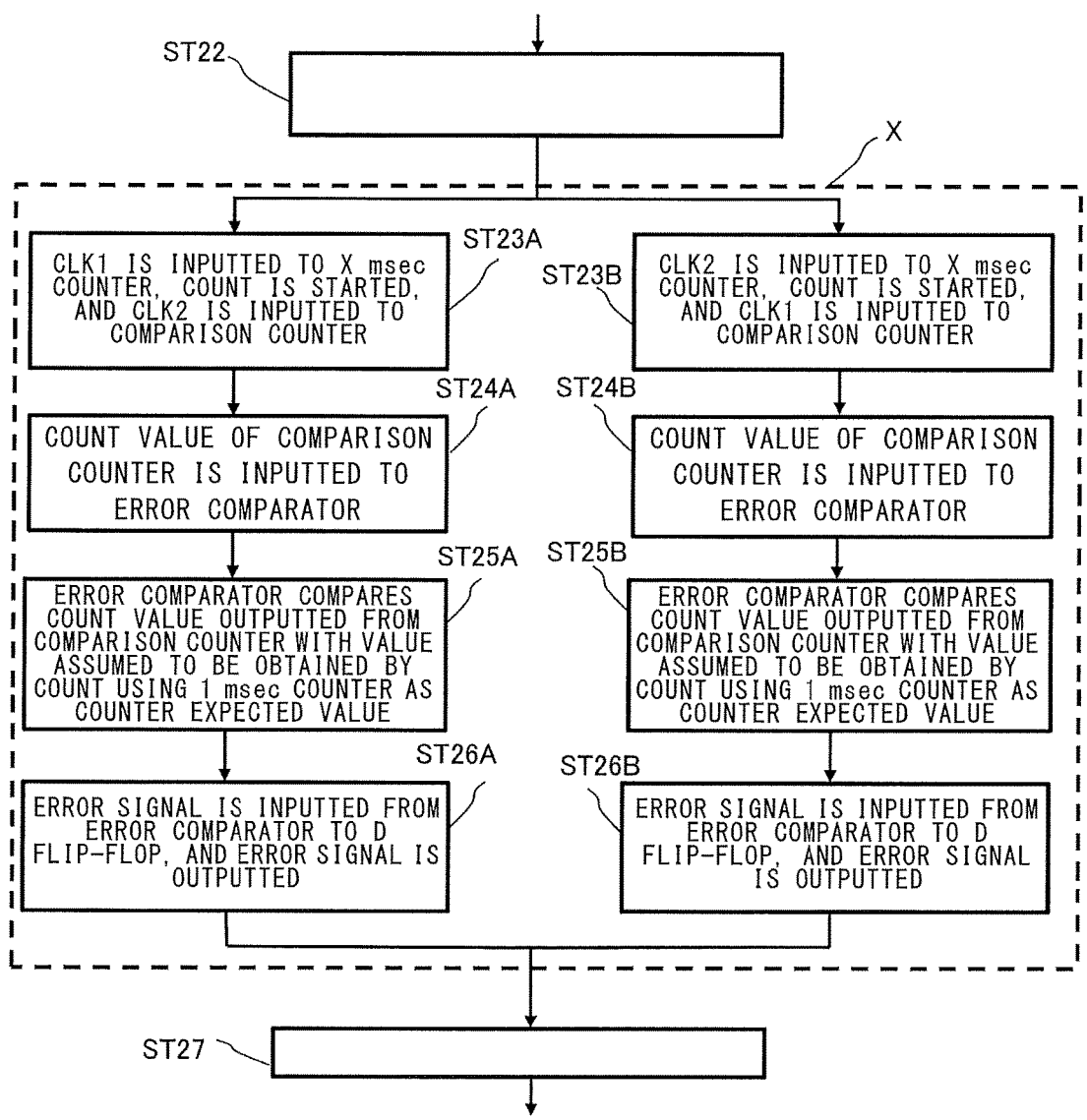
FIG. 7B is a flowchart for illustrating the procedure through which the clock signal inspection device according to Embodiment 1 of the present invention diagnoses the soundness of the inspection device itself, and is a diagram for explaining the details of a portion X in FIG. 7A.

Next, the procedure of soundness diagnosis about whether the clock signal inspection device 52 is normally operating will be described with reference to FIGS. 7A and 7B. FIG. 7A is a flowchart for illustrating the procedure through which the clock signal inspection device according to Embodiment 1 of the present invention diagnoses the soundness of the inspection device itself. FIG. 7B is a diagram for explaining the details of a portion X (step ST23 to step ST26) in FIG. 7A.

The settings of the 1 msec counter 11 of the A-system inspection circuit 10 are changed thereby to configure the X msec counter 31, which performs count for an optional time, whereby the A-system diagnosis circuit 30 in FIG. 5 is configured. Similarly, the settings of the 1 msec counter 21 of the B-system inspection circuit 20 are changed thereby to configure the X msec counter 41, which performs count for an optional time, whereby the B-system diagnosis circuit 40 in FIG. 5 is configured (step ST21).

When the clock signal CLK is inputted to the clock signal inspection device 52, the clock signals CLK1 and CLK2, which are two clock signals having the same frequency, are generated (step ST22).

The clock signal CLK2 is inputted to the X msec counter 31 of the A-system diagnosis circuit 30, and the X msec counter 31 starts count. At the same time, the clock signal CLK1 is inputted to the comparison counter 32 of the A-system diagnosis circuit 30, and the comparison counter 32 starts count (step ST23).

After the optional time (X msec), the count of the X msec counter 31 ends, the count value of the X msec counter 31 is inputted to the EN terminal of the comparison counter 32, and the count value of the comparison counter 32 at this time is inputted to the input terminal A of the error comparator 34 (step ST24).

The error comparator 34 compares the counter expected value 33 that is inputted to the input terminal B and that the comparison counter 32 is assumed to output, with the count value inputted from the comparison counter 32 (step ST25). Here, the counter expected value 33 is a value (expected value) that the comparison counter 32 is assumed to output when the X msec counter 31 is a 1 msec counter.

Here, since the counter expected value 33 is a value that the comparison counter 32 is assumed to output when the X msec counter 31 is a 1 msec counter, the error comparator 34 compares the count values of the 1 msec counter and the X msec counter with respect to the clock signals having the same frequency. Therefore, an error signal is inputted to the input terminal D of the D flip-flop circuit 35. When the pulse signal from the X msec counter 31 is inputted to the EN terminal of the D flip-flop circuit 35 (H), the output is validated, and the error signal is outputted from the D flip-flop circuit 35 (step ST26).

The same applies to the case of diagnosing the B-system inspection circuit 20 in FIG. 3. As shown in FIG. 7B, diagnosis is performed in the A-system diagnosis circuit 30 through a procedure of step ST23A to step ST26A and performed in the B-system diagnosis circuit 40 through a procedure of step ST23B to step ST26B.

The error signals being outputted from the output terminals Q of the D flip-flop circuits 35 and 45 are confirmed, and the settings of the X msec counters 31 and 41 are returned to the 1 msec counters 11 and 21 thereby to change the A-system diagnosis circuit 30 into the A-system inspection circuit 10 and change the B-system diagnosis circuit 40 into the B-system inspection circuit 20 (step ST27).

In step ST02 to step ST05, clock signal inspection is performed similarly to the procedures step ST02A to step ST05A and step ST02B to step ST05B of clock signal inspection using the flowchart in FIG. 6.

In step ST05 in FIG. 7A, the clock signal for which the 1 msec counter is used is confirmed, and if it is determined that there is no error, this means that normal operation of the clock signal inspection circuit can be confirmed (step ST28).

On the other hand, in ST05, the clock signal for which the 1 msec counter is used is confirmed, and if it is determined that there is an error, the inspection circuit is determined to require reconfirmation or the like (step ST29).

When both the A-system inspection circuit 10 and the B-system inspection circuit 20 proceed to step ST29, the clock signal is stopped.

In the above embodiment, the example in which both the A-system inspection circuit 10 and the B-system inspection circuit 20 are diagnosed has been described. However, the diagnosis procedures for the A-system inspection circuit 10 and the B-system inspection circuit 20 may be individually performed.

For example, during inspection of the clock signal by the A-system inspection circuit 10, the settings of the 1 msec counter 21 of the B-system inspection circuit 20 are changed thereby to configure the X msec counter 41, and the B-system inspection circuit 20 is diagnosed. Alternately, during inspection of the clock signal by the B-system inspection circuit 20, the settings of the 1 msec counter 11 of the A-system inspection circuit 10 are changed thereby to configure the X msec counter 31, and the A-system inspection circuit 10 is diagnosed.

As described above, without stopping the clock signal, online, one of the inspection circuits can perform inspection of the clock signal, and the other inspection circuit can perform diagnosis of the inspection circuit itself.

In the above embodiment, the example in which the 1 msec counter is used in the inspection circuit and the X msec counter is used in the diagnosis circuit for the inspection circuit has been described. However, the 1 msec counter may be a counter that perform count for an optional time different from that of the X msec counter.

Regarding a conventional clock signal inspection device, if the inspection device is determined as having an error, a clock signal stops, and a control device or an arithmetic processing unit that operates by the clock signal stops. However, in the embodiment of the present invention, the two systems of the inspection circuits are included as the clock signal inspection device, and the inspection circuits can be separately diagnosed without stopping the clock signal. In addition, diagnosis results can be individually determined, and if any of the inspection circuits is normally operating, the clock signal does not have to be stopped carelessly. Accordingly, in the controller such as the plant monitoring controller, the soundness of the clock signal and the soundness of the frequency inspection device for the clock signal can be confirmed without stopping the arithmetic processing unit, the communication controller, and the like, which contributes to safety and high reliability.

The embodiment may be modified or abbreviated as appropriate within the scope of the present invention.

Various modifications and alterations of this invention will be apparent to those skilled in the art without departing from the scope and spirit of this invention, and it should be understood that this is not limited to the illustrative embodiments set forth herein.

What is claimed is:

1. A clock signal inspection device comprising:
a first clock signal inspection circuit including
a first counter to which a first clock signal is inputted and which counts the first clock signal for a first time,
a first comparison counter to which a second clock signal having the same frequency as that of the first clock signal is inputted and which counts the second clock signal and outputs a count value of the second clock signal in response to an output signal from the first counter,
a first comparator which compares an expected value expected to be obtained by the first comparison counter counting the second clock signal for the first time, with the count value outputted from the first comparison counter, and outputs an error signal if there is an error therebetween, and
a first output circuit which outputs the error signal to the outside in response to the output signal from the first counter when the error signal is inputted from the first comparator; and
a second clock signal inspection circuit including
a second counter to which the second clock signal is inputted and which counts the second clock signal for the first time,
a second comparison counter to which the first clock signal is inputted and which counts the first clock signal and outputs a count value of the first clock signal in response to an output signal from the second counter,
a second comparator which compares an expected value expected to be obtained by the second comparison counter counting the first clock signal for the first time, with the count value outputted from the second comparison counter, and outputs an error signal if there is an error therebetween, and
a second output circuit which outputs the error signal to the outside in response to the output signal from the second counter when the error signal is inputted from the second comparator, wherein
in the first clock signal inspection circuit,
a time for which count is performed by the first counter is changed from the first time to a second time,
the first comparator compares the count value of the second clock signal outputted from the first comparison counter in response to the output signal from the first counter, with the expected value expected to be obtained by the first comparison counter counting the second clock signal for the first time, and outputs the error signal, and
then, the time for which count is performed by the first counter is changed from the second time to the first time, the first comparator compares the expected value expected to be obtained by the first comparison counter counting the second clock signal for the first time, with the count value of the second clock signal outputted from the first comparison counter, and soundness of the first clock signal inspection circuit is determined.

2. The clock signal inspection device according to claim 1, wherein
in the second clock signal inspection circuit,
a time for which count is performed by the second counter is changed from the first time to the second time,
the second comparator compares the count value of the first clock signal outputted from the second comparison counter in response to the output signal from the second counter, with the expected value expected to be obtained by the second comparison counter counting the first clock signal for the first time, and outputs the error signal, and then, the time for which count is performed by the second counter is changed from the second time to the first time, the second comparator compares the expected value expected to be obtained by the second comparison counter counting the first clock signal for the first time, with the count value of the first clock signal outputted from the second comparison counter, and soundness of the second clock signal inspection circuit is determined.

3. The clock signal inspection device according to claim 1, wherein the first time is 1 msec, and the first counter is a 1 msec counter.

4. The clock signal inspection device according to claim 2, wherein the first time is 1 msec, and the first counter is a 1 msec counter.

5. A plant monitoring controller comprising an input circuit to which a signal from a input circuit to which a signal from a device forming a plant is inputted, an arithmetic processing unit which performs arithmetic processing on the signal, an output circuit which outputs data resulting from the arithmetic processing to the device forming the plant, and a communication circuit which receives a signal from a central controller and transmits the signal from the device forming the plant and the data resulting from the arithmetic processing to the central controller, and the clock signal inspection device according to claim 1 for inspecting a clock signal used for controlling the communication circuit.

6. A plant monitoring controller comprising an input circuit to which a signal from a device forming a plant is inputted, an arithmetic processing unit which performs arithmetic processing on the signal, an output circuit which outputs data resulting from the arithmetic processing to the device forming the plant, and a communication circuit which receives a signal from a central controller and transmits the signal from the device forming the plant and the data resulting from the arithmetic processing to the central controller, and the clock signal inspection device according to claim 2 for inspecting a clock signal used for controlling the communication circuit.

7. A plant monitoring controller comprising an input circuit to which a signal from a device forming a plant is inputted, an arithmetic processing unit which performs arithmetic processing on the signal, an output circuit which outputs data resulting from the arithmetic processing to the device forming the plant, and a communication circuit which receives a signal from a central controller and transmits the signal from the device forming the plant and the data resulting from the arithmetic processing to the central controller, and the clock signal inspection device according to claim 3 for inspecting a clock signal used for controlling the communication circuit.

8. A plant monitoring controller comprising an input circuit to which a signal from a device forming a plant is inputted, an arithmetic processing unit which performs arithmetic processing on the signal, an output circuit which outputs data resulting from the arithmetic processing to the device forming the plant, and a communication circuit which receives a signal from a central controller and transmits the signal from the device forming the plant and the data resulting from the arithmetic processing to the central controller, and the clock signal inspection device according to claim 4 for inspecting a clock signal used for controlling the communication circuit.

9. The plant monitoring controller according to claim 5, wherein a communication controller which controls the communication circuit is composed of an FPGA.

10. The plant monitoring controller according to claim 6, wherein a communication controller which controls the communication circuit is composed of an FPGA.

11. The plant monitoring controller according to claim 7, wherein a communication controller which controls the communication circuit is composed of an FPGA.

12. The plant monitoring controller according to claim 8, wherein a communication controller which controls the communication circuit is composed of an FPGA.

13. A method for diagnosing soundness of a clock signal inspection device for inspecting a clock signal having a predetermined frequency, the method comprising an inspection method for a second clock signal comprising:

generating a first clock signal and the second clock signal having the same frequency from the clock signal, counting the first clock signal inputted to a first counter, and counting the second clock signal inputted to a comparison counter, for a first time, inputting a count value of the comparison counter to an error comparator after elapse of the first time, the error comparator comparing the count value inputted from the comparison counter with an expected value expected to be obtained by the comparison counter counting the second clock signal for the first time, and determining presence/absence of an error, and outputting an error signal from an output circuit if the error comparator determines that there is an error, wherein the method further comprises changing a time from which count is performed by the first counter, from the first time to a second time, counting the first clock signal inputted to the first counter and counting the second clock signal inputted to the comparison counter, inputting a count value of the comparison counter to the error comparator after elapse of the second time, changing the time for which count is performed by the first counter, from the second time to the first time, counting the first clock signal inputted to the first counter and counting the second clock signal inputted to the comparison counter, inputting a count value of the comparison counter to the error comparator after elapse of the first time, and the error comparator comparing the count value inputted from the comparison counter with the expected value expected to be obtained by the comparison counter counting the second clock signal for the first time, and determining presence/absence of an error.

* * * * *

UNITED STATES PATENT AND TRADEMARK OFFICE
CERTIFICATE OF CORRECTION

PATENT NO. : 10,528,417 B2
APPLICATION NO. : 15/877757
DATED : January 7, 2020
INVENTOR(S) : Yoshiyuki Nishino It is certified that error appears in the above-identified patent and that said Letters Patent is hereby corrected as shown below:

Column 13, Claim 5, amend Lines 1-2 as follows:
5. A plant monitoring controller comprising an input circuit to which a signal from a device forming a plant is inputted, an arithmetic processing unit which performs arithmetic processing on the signal, an output circuit which outputs data resulting from the arithmetic processing to the device forming the plant, a communication circuit which receives a signal from a central controller and transmits the signal from the device forming the plant and the data resulting from the arithmetic processing to the central controller, and the clock signal inspection device according to claim 1 for inspecting a clock signal used for controlling the communication circuit.

Signed and Sealed this
Seventeenth Day of March, 2020

Andrei Iancu
*Director of the United States Patent and Trademark Office*